United States Patent [19]

Hasegawa et al.

[11] Patent Number: 4,596,886
[45] Date of Patent: Jun. 24, 1986

[54] POLYESTER CONTAINING IMPURE 1,2-BUTANEDIOL

[75] Inventors: Ryuichi Hasegawa; Kohji Hayashi, both of Kuwana, Japan

[73] Assignee: Mitsubishi Monsanto Chemical Company, Tokyo, Japan

[21] Appl. No.: 478,105

[22] Filed: Mar. 23, 1983

[30] Foreign Application Priority Data

Apr. 30, 1982 [JP] Japan ................................. 57-73205
Jun. 24, 1982 [JP] Japan ............................... 57-109042
Jun. 25, 1982 [JP] Japan ............................... 57-109613

[51] Int. Cl.$^4$ .................... C07C 69/773; C07C 69/80; C07C 69/82
[52] U.S. Cl. ......................................... 560/90; 560/89; 560/92; 560/94; 560/198; 560/199; 560/204
[58] Field of Search ....................... 560/89, 90, 92, 94, 560/198, 199, 204, 91

[56] References Cited

U.S. PATENT DOCUMENTS

| | | | |
|---|---|---|---|
| 3,288,842 | 11/1966 | Verdol | 560/89 |
| 3,641,111 | 2/1972 | Lazarus | 560/94 |
| 3,654,211 | 4/1972 | Lutz | 560/94 X |
| 3,907,863 | 9/1975 | Voss | 560/94 X |
| 4,018,815 | 4/1977 | Vogt et al. | 560/89 X |
| 4,122,057 | 10/1978 | Lamont et al. | 560/199 X |

FOREIGN PATENT DOCUMENTS

| | | |
|---|---|---|
| 3111526A1 | 1/1982 | Fed. Rep. of Germany . |
| 2259853 | 8/1975 | France . |
| 524651 | 8/1972 | Switzerland . |
| 1105620 | 3/1968 | United Kingdom . |

Primary Examiner—Natalie Trousof
Assistant Examiner—Vera C. Clarke
Attorney, Agent, or Firm—Oblon, Fisher, Spivak, McClelland & Maier

[57] ABSTRACT

A polyester being liquid at 25° C. comprises a polybasic acid and a polyhydric alcohol as its monomer constituents, wherein the polyhydric alcohol is composed at least partially of 1,2-butanediol.

7 Claims, No Drawings

POLYESTER CONTAINING IMPURE 1,2-BUTANEDIOL

The present invention relates to a novel polyester having low viscosity and excellent compatibility with synthetic resins and being useful as a polyester-type plasticizer and novel processes for the production of the polyester.

Ester-type plasticizers such as dioctylphthalate (DOP) or dioctyladipate have been widely used for the improvement of the processability or flexibility of synthetic resins. Among them, polyester-type plasticizers are preferably used for the application where durability such as heat aging resistance or oil resistance is required.

Polyesters to be used as polyester-type plasticizers are usually prepared by condensing a polyhydric alcohol such as ethylene glycol, 1,3-propanediol, 1,3-butanediol or 1,4-butanediol, with a polycarboxylic acid such as phthalic acid, adipic acid or trimellitic acid, followed by terminal treatment with a monohydric alcohol or a monocarboxylic acid. The properties of the such polyesters as plasticizers are interrelated with the degree of condensation (average molecular weight). The lower the degree of condensation, the better the plasticizing efficiency, cold resistance and processability of synthetic resins, while the properties such as the heat aging resistance, oil resistance or non-migration property tend to be deteriorated.

On the other hand, polyesters having a high degree of condensation are inferior in their compatibility with synthetic resins as compared with a monomeric plasticizer such as dioctyl-phthalate, whereby the plasticizing efficiency and processability tend to be deteriorated, and they have a serious drawback that their viscosity tends to be so high that the operability will be inferior. Namely, among the conventional polyester type plasticizers, there has been none which has good durability as well as low viscosity and satisfactory compatibility with synthetic resins.

Further, in the conventional polyesters, the abovementioned alcohols are used as a polyhydric alcohol. However, 1,2-butanediol (i.e., 1,2-butylene glycol) which is formed as a by-product during the preparation of 1,4-butanediol by the reaction of butadiene with acetic acid, usually contains impurities, for instance, acetoxy compounds such as 1-acetoxy-2-hydroxybutane, 1-hydroxy-2-acetoxybutane or 1,2-diacetoxybutane, and its yield is relatively small. For these reasons, 1,2-butanediol has not been used as an alcohol for a polyester as a plasticizer. If 1,2-butanediol formed as a by-product during the preparation of 1,4-butanediol were to be used, it would be natural to attempt to purify it by removing impurities contained in it and use 1,2-butanediol in the purified form. However, the amount of 1,2-butanediol formed as a by-product is so small that it is not economically feasible to conduct purification treatment. Accordingly, such 1,2-butanediol produced as a by-product is used to be disposed as a waste or burned.

The present inventors have conducted extensive researches to develop polyesters having low viscosity and good compatibility with synthetic resins and have found that a polyester obtained by condensing 1,2-butanediol (i.e. 1,2-butylene glycol or 1,2-dihydroxybutane, hereinafter sometimes referred to as 1,2-BG) which has not been utilized, together with other glycols such as 1,3-butanediol or 1,4-butanediol, with a polycarboxylic acid, has low viscosity in spite of the fact its average molecular weight is relatively high, and that a similar effect is obtainable even when 1,2-BG is used alone. It has been also found that when used as a plasticizer, such a polyester is superior to other polyester-type plasticizers in the compatibility with synthetic resins. Further, during the course of repeated studies to use 1,2-butanediol which is formed as a by-product during the preparation of 1,4-butanediol and which contains acetoxy compounds, together with a terminal treating agent directly, i.e., without purification, for the preparation of a polyester, the present inventors have unexpectedly found that it is possible to obtain a polyester useful as an extremely good plasticizer, with its terminals treated by acetic acid formed during the preparation without an addition of a terminal treating agent such as a monohydric alcohol or a monobasic acid serving as a molecular weight controlling agent. It has been found further that when such a polyester is subjected to transesterification or esterification with a monobasic acid having a carbon atom number greater than acetic acid or a monohydric alcohol, a polyester-type plasticizer having more improved durability is obtainable.

Namely, it is the first object of the present invention to provide a novel polyester having low viscosity and excellent compatibility with synthetic resins.

The second object of the present invention is to provide a process for preparing a polyester wherein acetic acid formed during the condensation of a polybasic acid with crude 1,2-BG containing acetoxy compounds such as acetoxy butane, which are derivatives of 1,2-butanediol, is used as a terminal treating agent.

The third object of the present invention is to provide a process for preparing a polyester wherein a polyester with its terminals treated by acetic acid formed during the condensation of polybasic acid with crude 1,2-BG containing acetoxy compounds such as acetoxy butane, which are derivatives of 1,2-butanediol, is further subjected to a transesterification reaction with a monobasic acid having a higher molecular weight than acetic acid.

The fourth object of the present invention is to provide a process for producing a polyester with its terminals treated with a monohydric alcohol without being affected by acetic acid formed by the transesterification reaction of crude 1,2-BG containing acetoxy compounds such as acetoxy butane, which are derivatives of 1,2-butanediol.

Thus, firstly, present invention provides a polyester being liquid at 25° C. and comprising a polybasic acid (inclusive of its anhydride) and a polyhydric alcohol as its monomer constituents, wherein the polyhydric alcohol is composed at least partially of 1,2-butanediol.

Secondly, the present invention provides a process for producing a polyester being liquid at 25° C. from a polybasic acid and a polyhydric alcohol, wherein a polyhydric alcohol composed at least partially of 1,2-butanediol containing acetoxyhydroxybutane and/or diacetoxybutane as impurities is subjected to condensation and transesterification reactions with a polybasic acid and an excess amount of acetic acid thereby formed is removed from the system during or after the reactions.

Thirdly, the present invention provides a process for producing a polyester being liquid at 25° C. from a polybasic acid and a polyhydric alcohol, wherein a polyhydric alcohol composed at least partially of 1,2-butanediol containing acetoxyhydroxybutane and/or diacetoxybutane as impurities is subjected to condensation and transesterification reactions with a polybasic acid, and an excess amount of acetic acid thereby formed is removed from the system during or after the reactions, and with an addition of a monobasic acid having a higher molecular weight than acetic acid, a transesterification reaction is further conducted.

Fourthly, the present invention provides a process for producing a polyester being liquid at 25° C. from a polybasic acid, a polyhydric alcohol and a monohydric alcohol, wherein a polybasic acid and a polyhydric alcohol composed at least partially of 1,2-butanediol containing acetoxyhydroxybutane and/or diacetoxybutane are subjected to condensation and transesterification reactions, acetic acid thereby formed is removed from the reaction system, and then a monohydric alcohol is added for terminal treatment.

Now, the present invention will be described in detail with reference to the preferred embodiments.

The polybasic acid to be used for the polyester of the present invention may be any acid so long as it contains in its molecule at least two carboxyl groups (including an anhydride) whether it is aliphatic, aromatic or alicyclic, and it may be a polybasic acid commonly used for the production of conventional polyester-type plasticizers. Specifically, there may be mentioned phthalic anhydride, isophthalic acid, terephthalic acid, trimellitic acid anhydride, pyromellitic acid anhydride, glutaric acid, adipic acid, azelaic acid and sebacic acid. These polybasic acids may be used alone or in combination as a mixture of two or more different kinds. In the present invention, phthalic anhydride, trimellitic acid anhydride and adipic acid are particularly preferred.

If, as a polyester of the present invention, a high purity product is to be obtained, it is necessary to use purified 1,2-butanediol or 1,2-butanediol having a purity of at least 90%. For the purpose of producing a polyester to be used as a plasticizer, 1,2-butanediol may be used as a mixture with at least one of other polyhydric alcohols such as ethylne glycol, 1,3-propanediol, 1,3-butanediol, 1,4-butanediol, 1,5-pentanediol, 1,6-hexanediol, neopentyl glycol or pentaerythritol. Such a mixture preferably contains at least 10% by weight, especially at least 20% by weight, of 1,2-butanediol.

Further, in a process for preparing a polyester according to the present invention, crude 1,2-butanediol (hereinafter referred to as crude 1,2-BG) containing acetoxyhydroxybutane and/or diacetoxybutane may be used as 1,2-butanediol. Crude 1,2-BG is usually formed as a by-product during the preparation of 1,4-butanediol by the reaction of butadiene with acetic acid, such crude 1,2-BG contains various acetoxy compounds. For instance, from a gas chromatography analysis, a typical sample of such crude 1,2-BG has been found to have a composition comprising 54% by weight of 1,2-BG, 23% by weight of 1-acetoxy-2-hydroxybutane, 8% by weight of 1-hydroxy-2-acetoxybutane, 10% by weight of 1,2-diacetoxybutane and 5% by weight of other substances such as 1,3-butanediol and 1,4-butandiol, and thus it has been found that the major components of the impurities are acetoxy derivatives of 1,2-BG.

The process of the present invention has a feature and an advantage in that even crude 1,2-BG containing such impurities may be used without any trouble.

For the purpose of the present invention, the amount of crude 1,2-BG includes the amounts of acetoxyhydroxybutane and diacetoxybutane as calculated as 1,2-butanediol. Accordingly, when the amount of the polyhydric alcohol is referred to, it includes the amounts of acetoxyhydroxybutane and diacetoxybutane, if any, as calculated as 1,2-butanediol.

According to the process of the present invention, crude 1,2-BG may be used in optional combination with the above-mentioned polyhydric alcohols to obtain a polyester having desired properties.

According to another aspect of the present invention, a monohydric alcohol or a monobasic acid serving as a molecular weight controlling agent is added during the preparation of the polyester. For instance, as such a monohydric alcohol, there may be mentioned methanol, ethanol, propanol, butanol, pentanol, hexanol, heptanol, n-octanol, 2-ethylhexanol, nonanol, decanol, undecanol, dodecanol or tridecanol. These monohydric alcohols may be used alone or in combination as a mixture. Among these alcohols, preferred are alcohols having a carbon atom number within a range of from 4 to 13, especially from 6 to 10. When a polyester being useful as a plasticizer is prepared with a monohydric alcohol having a small number of carbon atoms, it tends to have more or less inferior durability or cold resistance as compared with the one prepared with a monohydric alcohol having a greater number of carbon atoms, although it has good compatibility with synthetic resins. On the other hand, when a monohydric alcohol having a great number of carbon atoms is used, it will be difficult to remove an excess amount of the alcohol during the preparation of the polyester, and the plasticizer thereby obtained tends to have poor compatibility. Therefore, it is preferred to use a monohydric alcohol having a carbon atom number within the above-mentioned range.

As the monobasic acid, there may be mentioned, for instance, propanoic acid (propionic acid), butanoic acid (butyric acid), 2-methylpropanoic acid (isobutyric acid), pentanoic acid (valeric acid), hexanoic acid, heptanoic acid, octanoic acid, nonanoic acid, decanoic acid, undecanoic acid, dodecanoic acid (lauric acid), tridecanoic acid, tetradecanoic acid (myristic acid), pentadecanoic acid, hexadecanoic acid (palmitic acid), heptadecanoic acid, octadecanoic acid (stearic acid), cyclohexanoic acid or benzoic acid. However, the monobasic acid is not restricted to these specific examples. For the same reasons as mentioned with respect to the monohydric alcohol, the monobasic acid is preferably a monocarboxylic acid having a carbon atom number within a range of from 4 to 18, particularly from 8 to 14.

The proportions of 1,2-butanediol and the polybasic acid for the production of a polyester of the present invention vary to a great extent depending upon whether or not the molecular weight controlling agent is used or whether a monohydric alcohol or a monobasic acid is used as the molecular weight controlling agent, or depending upon the amount of the molecular weight controlling agent. Further, such proportions vary depending upon the amounts of other glycols to be used in combination.

When no molecular weight controlling agent is used or a monobasic acid is used as a molecular weight controlling agent, the amount of 1,2-butanediol is preferably within a range of from 1 to 3 equivalents, more preferably from 1.05 to 2.5 equivalents, relative to 1 equivalent of the polybasic acid. When 1,2-butanediol is used in combination with other polyhydric alcohol, the above preferred range of from 1 to 3 equivalents applies to the total amount.

Further, for the purpose of transesterification, the monobasic acid may be used in such an amount as is required for the substitution of acetic acid. Practically, such an amount is determined in consideration of the particular use and the properties of the polyester obtained, and it is not so critical. However, it is usually preferred to use such a monobasic acid in an amount within a range of upto 4 equivalents relative to 1 equivalent of the polybasic acid. A polyester having desired properties may be obtained by properly selecting the kind of the monobasic acid and degree of the substitution of the acetic acid by the monobasic acid. More specifically, it is most preferred, for instance, to select the proportions within the ranges such that 1,2-butanediol or a mixture of 1,2-butanediol and other dihydric alcohols is from 40 to 50 mol %, a polybasic acid is from 20 to 50 mol % and a monobasic acid is from 40 to 0 mol %. Further, it is preferred that the amount of the polyhydric alcohol is at least equivalent to the polybasic acid.

When crude 1,2-BG is used as 1,2-butanediol in the above-mentioned process, the acetyl groups of actoxyhydroxybutane and diacetoxybutane in the crude 1,2-BG undergo transesterification with the polybasic acid, whereby acetic acid will be freed. A part of acetic acid thus formed serves as a molecular weight controlling agent (a terminal treating agent) for the polyester, and the excess amount of acetic acid and water are removed from the condensation system. After the reaction has proceeded to some extent, the pressure in the system is gradually reduced to remove the acetic acid and water. In this case, for the purpose of facilitating the freeing of the acetic acid and improving the recovery rate, a solvent capable of forming an azeotropic composition with acetic acid or with a combination of acetic acid and water, such as toluene, xylene, n-octane, ethylcyclohexane or butylethyl ether may be used.

In a case where the amount of the acetoxy compound in the crude 1,2-BG is inadequate to serve as a molecular weight controlling agent or a transesterification reaction with a monobasic acid having a higher molecular weight than acetic acid is to be carried out, a monobasic acid is additionally added and the esterification or transesterification reactions are continued. Such a transesterification reaction can readily be carried out under heating. The timing of the addition of the monobasic acid may be either during or after the removal of acetic acid.

The polyester thus obtained has superior durability as well as excellent compatibility with synthetic resins and thus shows superior characteristics.

On the other hand, when a monohydric alcohol is used as a molecular weight controlling agent, the amount of 1,2-butanediol is preferably within a range of from 0.1 to 1.3 equivalents, more preferably from 0.1 to 1 equivalent, relative to 1 equivalent of the polybasic acid. When 1,2-butandiol is used in combination with other polyhydric alcohols, the above-mentioned preferred range of from 0.1 to 1.3 applies to the total amount. It is particularly preferred that the amount of the polybasic acid is greater than the equivalent amount of the polyhydric alcohol. On the other hand, the amount of the monohydric alcohol is not critical since an excess amount of the monohydric alcohol is removed from the system during the condensation. However, it is usually used in an amount within a range of from 0.02 to 6 equivalents relative to 1 equivalent of the polybasic acid. More specifically, it is most preferred, for instance, to select the proportions within the ranges such that 1,2-butanediol or a mixture of 1,2-butanediol and other dihydric alcohols is from 20 to 49 mol %, a dibasic acid is from 40 to 50 mol % and a monohydric alcohol is from 40 to 2 mol %.

For the production of the polyester of the present invention, usually a polybasic acid, a polyhydric alcohol and a monohydric alcohol or a monobasic acid are heated in the presence or absence of a catalyst, if necessary, in a nitrogen atmosphere, and the reaction is continued while removing formed water. The heating temperature is not critical. However, it is preferred to conduct the reaction at a temperature of at least the boiling point of the reaction mixture (i.e. the azeotropic point). After the reaction has proceeded to some extent, the pressure in the system is reduced and water formed by the reaction and an excess amount of the alcohol are removed while gradually increasing the degree of the reduced pressure. As the catalyst, a metal compound such as diethyl tin oxide, dibutyl tin oxide, tin oxide, zinc oxide, tetraisopropyl titanate or tetrabutyltitanate, may usually be used.

In the reaction system wherein crude 1,2-BG and a monohydric alcohol as a molecular weight controlling agent are used, firstly a polybasic acid and the crude 1,2-BG are heated in the presence or absence of a catalyst, if necessary, in a nitrogen atmosphere to conduct esterification while carrying out transesterification of acetoxyhydroxybutane and/or diacetoxybutane in the crude 1,2-BG and removing acetic acid and water thereby formed from the system. After the reaction has proceeded to some extent, the pressure in the system is reduced and the removal of acetic acid and water is carried out while gradually increasing the degree of the reduced pressure. In this case, for the purpose of facilitating the freeing of acetic acid and improving the recovery rate, the above-mentioned solvent capable of forming an azeotropic composition with acetic acid or a combination of acetic acid and water may be present in the reaction system.

After the removal of acetic acid, a monohydric alcohol is added to the system and the reaction system is heated to conduct the terminal treatment of the unreacted portions of the polybasic acid while removing water. Then, the degree of the reduced pressure is gradually increased to remove an excess amount of the alcohol. If the removal of acetic acid is inadequate, the monohydric alcohol will react with the acetic acid to form an ester, whereby not only the consumption of the monohydric alcohol increases but also the ester thus formed will be contained in the polyester. An additional operation will then be required to remove the ester from the polyester.

According to the process for the production of the polyester of the present invention, it is possible to use 1,2-BG which has not been utilized as a polyhydric alcohol in the conventional process for the production of a polyester, and it is particularly advantageous that crude 1,2-BG which is formed as a by-product during the production of 1,4-butanediol and whih contains acetoxy compounds such as 1-acetoxy-2-hydroxybutane, 1-hydroxy-2-acetoxybutane or 1,2-diacetoxybutane, can be directly used for the production of a polyester without necessity of purification. Such impurities do not interfere with the production of the polyester. All that is required is to remove acetic acid formed by the transesterification and condensation reactions of the polybasic acid with the crude 1,2-BG.

Further, a polyester with its terminals treated by acetic acid may be subjected to a transesterification reaction with a monobasic acid having a higher molecular weight than acetic acid to substitute a desired amount of the terminal acetic acid, whereby a polyester having desired physical properties may be obtained. Accordingly, when such a polyester is used as a plasticizer, the compatibility and the durability can optionally be selected from the wide ranges. Likewise, it is possible to obtain a polyester having desired properties by carrying out esterification with a monohydric alcohol after removing acetic acid adequately. Thus, the physical properties of the polyester can be optionally controlled within the wide range.

The average polymerization degree and the average molecular weight of the polyester thus prepared are calculated from the molar ratio of the starting materials which are obtained by the hydrolysis of the polyester, and from the infrared spectrum analysis (IR), it has been confirmed that there exists an ester bond (—COO—) and there remains no substantial amount of hydroxyl groups (—OH) attributable to the starting material alcohol.

The polyester of the present invention is liquid at a temperature of 25° C. and has low viscosity by itself. Thus, it is useful as a new plasticizer having excellent compatibility with synthetic resins. The polyester of the present invention may be used as a plasticizer for thermoplastic resins such as a vinyl chloride resin, a vinylidene chloride resin, a vinyl acetate resin, a vinyl butyral resin or a methyl methacrylate resin. Further, it may be used as a solvent or diluent for various coatings.

When the polyester of the present invention is used as a plasticizer for a vinyl chloride resin, it may be used in an amount within a range of from 5 to 300 parts by weight, preferably from 30 to 200 parts by weight, based on 100 parts by weight of the vinyl chloride resin. The mixture may be uniformly mixed or kneaded by means of a tumble mixer, a box-type mixer, ballmill, a ribbon mixer, a change can mixer, a super mixer, a grinding mixer, mixing rolls, a ε-vane kneader, a Banbury mixer, a high speed double-shaft continuous mixer or an extrusion kneader to obtain a resin composition. When the polyester is in a range of from 5 to 20 parts by weight, the plasticizing efficiency is rather poor and it is preferred to incorporate a conventional plasticizer such as dioctyl phthalate. The resin composition thus prepared will be used for the preparation of a film, a sheet, a container, a floor material, a wall material or a polyvinyl chloride-coated steel plate.

Now the present invention will be described in further detail with reference to Examples. However, it should be understood that the present invention is by no means restricted by these specific Examples.

The viscosity and the average molecular weight of the polyester were obtained as follows;

Viscosity: The viscosity at 25° C. was measured by a BM-type viscometer (a kind of Brookfield type viscometer).

Average molecular weight: The polyester was hydrolyzed, and the average molecular weight was calculated from the molar ratio of the starting materials thereby obtained.

EXAMPLE 1 AND COMPARATIVE EXAMPLES 1 TO 3

Into a 500 ml four necked flask equipped with a stirrer, a thermometer, a fractionating column, a condenser and a gas-supply tube, 146 g (1 mol) of adipic acid, 81 g (0.9 mol) of 1,2-butanediol, (1,2-BG), a predetermined amount of 2-ethylhexanol (2-EH) and 0.25 g of dibutyl tin oxide as a catalyst were introduced and reacted at 200° C. for about 7 hours in a nitrogen atmosphere, and water formed by the reaction was removed. Then, the pressure in the system was gradually reduced to bring it finally to a level of about 5 mmHg. It took about 3 hours for this operation. The polyester thereby obtained had a acid value of not higher than 1 mg KOH/g.

From the infrared spectrum (IR), this polyester was found to have an ester bond and contain no substantial hydroxyl groups attributable to the starting alcohol. Then, the polyester was hydrolyzed in the following manner and its constituents were analyzed and the structure of the polyesters was determined.

2 g of the product was introduced into a 300 ml flat bottom flask containing 2 g of potassium hydroxide, 30 ml of water and 30 ml of ethanol, and after attaching a condenser, the mixture was heated under the boiling condition for 3 hours. After cooling the mixture, 4 ml of concentrated hydrochloric acid was added to obtain an acidic solution. From the gas chromatography analysis, the proportions of adipic acid, 1,2-BG and 2-EH in the aqueous solution were found to be as follows.

| | | | |
|---|---|---|---|
| A. Adipic acid | 1.21 g | $8.3 \times 10^3$ mol | 6.4 molar ratio |
| B. 1,2-BG | 0.62 g | $6.9 \times 10^{-3}$ mol | 5.3 molar ratio |
| C. 2-EH | 0.34 g | $2.6 \times 10^{-3}$ mol | 2 molar ratio |

The structural formula was as follows:

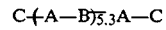

It was found that the average polymerization degree was 5.3 and the average molecular weight was 1,400. The average molecular weight and the viscosity (at 25° C.) of the polyester are shown in Table 1.

Into a beaker, 67 g of the polyester thus obtained, 100 g of a vinyl chloride resin having a polymerization degree of 1,050 and 1 g of a stabilizer were introduced, and the mixture was subjected to roll processing at 180° C. for 5 minutes and then to pressing at 150° C. for 5 minutes to obtain a sheet having a thickness of about 1 mm. The sheet was subjected to the following tests, and the results thereby obtained are shown in Table 1.

Tensile strength, elongation, 100% modulus:
  ASTM D 638-58T

Gasoline extraction:
  The sheet was dipped in a gasoline at 23° C. for 4 hours, then withdrawn and dried at 80° C. for 4 hours, and then it was again weighed, whereupon the amount of the loss of the plasticizer (the polyester) due to the extraction was represented by weight percentage.

Soap water extraction:
  The sheet was dipped in 1% soap water at 50° C. for 4 days and then dried at 50° C. for 1 day, whereupon the amount of the loss of the plasticizer (the polyester) due to the extraction was represented by weight percentage.

Evaporation loss:
  ASTM D 1203-52T

Low temperature flexing temperature:
  ASTM D 1043-51

Hardness:
  ASTM D 676-49T

Compatibility:

The plasticizer (polyester) exuded on the inner surface of the sample bent in a loop-shape was wiped with cigarette paper 1 day later and 1 week later, respectively prepared and tested in the same manner as in Example 1. The results thereby obtained are shown in Table 1.

TABLE 1

|  | Example 1 | | | Comp. Example | Comparative Example 2 | | | Comparative Example 3 | | |
|---|---|---|---|---|---|---|---|---|---|---|
|  | 1 | 2 | 3 | 1 | 1 | 2 | 3 | 1 | 2 | 3 |
| Dihydric alcohol | | 1,2-BG | | 1,3-PG | | 1,3-BG | | | 1,4-BG | |
| Amount (g) | | 81 | | 68 | | 81 | | | 81 | |
| 2-EH Amount (g) | 65 | 52 | 39 | 52 | 65 | 52 | 39 | 65 | 52 | 39 |
| Physical properties of the plasticizer (the polyester) | | | | | | | | | | |
| Average molecular weight | 1400 | 2400 | 2700 | 2300 | 1500 | 1800 | 2000 | 1700 | 2100 | 2700 |
| Viscosity (25° C.) (CP) | 640 | 1600 | 2500 | 2900 | 2000 | 3500 | 7100 | Solid | Solid | Solid |
| Physical properties of the press-formed sheet | | | | | | | | | | |
| Tensile strength (kg/cm$^2$) | 210 | 220 | 230 | 210 | 230 | 230 | 240 | 210 | 210 | 210 |
| Elongation (%) | 400 | 410 | 410 | 410 | 440 | 400 | 410 | 400 | 450 | 410 |
| 100% Modulus (kg/cm$^2$) | 82 | 89 | 96 | 88 | 82 | 90 | 97 | 79 | 84 | 85 |
| Gasoline extraction (%) | 12 | 5.1 | 0.7 | 4.8 | 11 | 7.0 | 1.2 | 1.0 | 0.6 | 0.3 |
| Soap water extraction (%) | 0.8 | 0.6 | 0.7 | 3.3 | 2.8 | 3.1 | 2.6 | 4.5 | 4.2 | 3.9 |
| Evaporation loss (%) | | | | | | | | | | |
| 1 day | 0.9 | 0.6 | 0.4 | 0.8 | 1.0 | 0.6 | 0.5 | 0.8 | 0.5 | 0.4 |
| 6 days | 3.3 | 2.1 | 1.2 | 3.4 | 4.1 | 3.0 | 2.4 | 2.7 | 2.6 | 2.1 |
| Low temperature flexing temperature (°C.) | −23 | −19 | −18 | −20 | −21 | −18 | −17 | −24 | −23 | −23 |
| Hardness | 71 | 73 | 74 | 73 | 70 | 72 | 73 | 70 | 71 | 71 |
| Compatibility | | | | | | | | | | |
| one day later | A | A | A | B | B | B | B | B | B | B |
| one week later | A | A | A | B | B | B | B | C | C | C |
| Non-migration property | | | | | | | | | | |
| ABS | B | B | B | B | B | B | B | C | C | C |
| PSR | A | A | A | A | A | A | A | A | A | A | tively. The degree was rated by three grades. Grade A: No exudation observed, Grade B: Slight exudation observed, and Grade C: Substantial exudation observed.

Non-migration property:

The sheet was sandwitched between an ABS resin sheet and a polystyrene (PSR) resin sheet and tested in an oven at 70° C. for 72 hours under a load pressure of 250 g/cm$^2$, and the results were evaluated by naked eye. Grade A: No substantial migration observed, Grade B: Slight migration observed, and Grade C: Substantial migration observed.

COMPARATIVE EXAMPLES 1, 2 AND 3

Polyesters were prepared in the same manner as in Example 1 except that 1,2-BG in Example 1 was replaced respectively by 1,3-propanediol (1,3-PG), 1,3-butanediol (1,3-BG) and 1,4-butanediol (1,4-BG), and 2-EH was used in the respective predetermined amounts. The vinyl chloride resin compositions were respectively prepared and tested in the same manner as in Example 1. The results thereby obtained are shown in Table 1.

It is evident that the polyesters prepared with use of 1,2-BG have low viscosity and excellent compatibility without losing desirable properties of the conventional polyester plasticizers.

EXAMPLES 2 TO 5 AND COMPARATIVE EXAMPLE 4

The polyesters were prepared substantially in the same manner as in Example 1 except that in No. 2 of Example 1, 1,2-BG, 1,3-BG and 1,4-BG were used in the proportions as shown in Table 2 and in a total amount of 81 g. Their physical properties and the physical properties of the sheets prepared by press-forming a mixture of the respective polyesters with a vinyl chloride resin were evaluated and shown in Table 2.

Further, the polyesters thus obtained were confirmed by IR to have an ester bond and contain no substantial hydroxyl groups.

TABLE 2

|  | Example | | | | Comparative Example |
|---|---|---|---|---|---|
|  | 2 | 3 | 4 | 5 | 4 |
| Dihydric alcohol composition (%) | | | | | |
| 1,2-BG | 75 | 50 | 50 | 25 | |
| 1,3-BG | | | 50 | 75 | 50 |
| 1,4-BG | 25 | 50 | | | 50 |
| Physical properties of the polyester | | | | | |
| Average molecular weight | 1900 | 2000 | 2100 | 2000 | 2200 |
| Viscosity 25° C. (CP) | 1200 | 1400 | 1000 | 1000 | 3900 |
| Physical properties of the press-formed sheet | | | | | |
| Tensile strength (kg/cm$^2$) | 200 | 200 | 200 | 210 | 210 |
| Elongation (%) | 400 | 410 | 400 | 410 | 410 |
| 100% Modulus (kg/cm$^2$) | 83 | 79 | 80 | 76 | 82 |
| Gasoline extraction (%) | 13 | 10 | 9.7 | 10 | 12 |
| Soap water extraction (%) | 1.2 | 1.4 | 0.9 | 1.0 | 7.0 |

TABLE 2-continued

| | Example | | | | Comparative Example |
|---|---|---|---|---|---|
| | 2 | 3 | 4 | 5 | 4 |
| Evaporation loss (%) | | | | | |
| 1 day | 0.8 | 0.6 | 0.7 | 0.8 | 0.5 |
| 6 days | 3.0 | 2.7 | 2.7 | 3.2 | 2.8 |
| Low temperature flexing temperature (°C.) | −22 | −24 | −21 | −22 | −24 |
| Hardness | 71 | 71 | 72 | 70 | 72 |
| Compatibility | | | | | |
| one day later | A | A | A | A | B |
| one week later | A | A | A | A | B |
| Non-migration property | | | | | |
| ABS | B | B | B | B | C |
| PSR | A | A | A | A | B |

The polyesters prepared with use of 1,4-BG alone are solid. However, with an addition of 1,2-BG, the polyesters become liquid and their viscosity is substantially reduced. Even when, 1,2-BG/1,4-BG=25/75, the polyester thereby obtained is liquid. Further, it is evident that when a small amount of 1,2-BG is used in combination with 1,3-BG, the plasticizer thereby obtained has low viscosity and excellent compatibility.

EXAMPLE 6

Into a 500 ml four-necked flask equipped with a stirrer, a thermometer, a fractionating column, a condenser and a gas-supply tube, 131 g (0.90 mol) of adipic acid, 112 g (1.05 mol, as calculated as 1,2-BG) of crude 1,2-BG (composition: 55% by weight of 1,2-BG, 35% by weight of acetoxyhydroxybutane and 10% by weight of diacetoxybutane), 42 g (0.21 mol) of lauric acid and 0.25 g of dibutyl tin oxide were introduced, and gradually heated to 200° C. in a nitrogen atmosphere, and water and acetic acid thereby formed were removed. The pressure was gradually reduced to bring it finally to 30 mmHg. It took 8 hours for this reaction.

Thereafter, distillation under reduced pressure of 5 mmHg was carried out, whereby 230 g of a polyester was obtained.

This polyester has an acid value of 0.84 mgKOH/g, a vicosity of 1800 cp and a average molecular weight of 2200. Further, from the IR analysis, it was confirmed that the polyester has an ester bond and contains no substantial hydroxyl groups attributable to the starting material alcohol.

Further, the amounts and the compositions of the aqueous layer and the oil layer recovered from the above-mentioned distillation under reduced pressure were as follows:

| Aqueous layer | 51 g | Acetic acid | 21 g | Recovery rate | 86% |
|---|---|---|---|---|---|
| | | Water | 28 g | | 98% |
| | | Others | 2 g | | |
| Oil layer | 8 g | Acetic acid | 2 g | | 8% |
| | | Others | 6 g | | |

EXAMPLE 7

Into a 500 ml four-necked flask equipped with stirrer, a thermometer, a fractionating column, a condenser and a gas-supply tube, 131 g (0.90 mol) of adipic acid, 112 g (b 1.05 mol) of crude 1,2-BG (composition: 55% by weight of 1,2-BG, 35% by weight of acetoxyhydroxybutane and 10% by weight of diacetoxybutane) and 0.25 g of dibutyl tin oxide as a catalyst were introduced and gradually heated to 200° C. in a nitrogen atmosphere, and acetic acid and water thereby formed were removed. The pressure in the reaction system was gradually reduced to bring it finally to 30 mmHg. It took 8 hours for the transesterification and acetic acid removal reactions.

The aqueous acetic acid solution recovered from this step was found by the analysis to have the following composition.

| Recovered amount | 40 g | Acetic acid | 12 g | Recovery rate | 47% |
|---|---|---|---|---|---|
| | | Water | 27 g | | 91% |
| | | Others | 1 g | | |

Further, vacuum distillation was conducted by further reducing the pressure to 5 mmHg, whereupon 7.2 g of an initial fraction and 185 g of a polyester were obtained.

2 g of the polyester thus obtained was introduced into a 300 ml flat bottom flask containing 2 g of potassium hydroxide, 30 ml of water and 30 ml of ethanol, and after attaching a condenser, the mixture was heated under a boiling condition for 3 hours. After cooling the mixture, 4 ml of concentrated hydrochloric acid was added to obtain an acidic solution. From the gas chromatography analysis, the proportions of the adipic acid, 1,2-BG and acetic acid in the aqueous solution were found to be as follows.

| Adipic acid | 1.29 g | $8.8 \times 10^{-3}$ mol | 9.8 molar ratio |
|---|---|---|---|
| 1,2-BG | 0.88 g | $9.8 \times 10^{-3}$ mol | 10.9 molar ratio |
| Acetic acid | 0.11 g | $1.8 \times 10^{-3}$ mol | 2.0 molar ratio |

The polyester was found to have an average polymerization degree of about 10 and an average molecular weight of 2200.

Further, it had a viscosity of 2700 cp and an acid value of 0.9 mgKOH/g.

EXAMPLE 8

187 g of the polyester prepared in the same manner as in Example 7 and 21 g (0.105 mol) of lauric acid were introduced in a flask and a transesterification reaction with acetic acid was conducted. The amount of lauric acid represents such an amount that as a terminal treating agent, the ratio of acetic acid:lauric acid is 1:1. The temperature was 200° C. and the pressure was gradually reduced to 10 mmHg in 3 hours. The amount and the composition of the oil recovered from this step were as follows:

| Amount of the oil | 7 g | Acetic acid | 5 g |
| --- | --- | --- | --- |
| | | Lauric acid | 1 g |
| | | Others | 1 g |

The polyester remained in the flask had an average molecular weight of 2500, a viscosity of 2600 cp and an acid value of 0.7 mgKOH/g.

EXAMPLE 9

Into a 500 ml four-necked flask equipped with a stirrer, a thermometer, a fractionating column, a condenser and a gas-supply tube, 146 g (1.0 mol) of adipic acid, 102 g (0.95 mol) of crude, 1,2-BG (composition: 55% by weight of 1,2-BG, 35% by weight of acetoxyhydroxybutane and 10% by weight of diacetoxybutane) and 0.25 g of dibutyl tin oxide as a catalyst were introduced and gradually heated to 200° C. in a nitrogen atmosphere, and acetic acid and water thereby formed were removed. The pressure in the reaction system was gradually reduced to bring it finally to 30 mmHg. It took 3 hours for the transesterification reaction and acetic acid removal.

The aqueous acetic acid solution recovered by this step was found by the analysis to have the following composition:

| Recovered Amount | 41.2 g | Acetic acid | 21.2 g | Recovery rate | 91% |
| --- | --- | --- | --- | --- | --- |
| | | Water | 18.6 g | | 68% |
| | | Crude 1,2-BG | 1.4 g | | |

To the reaction solution after the removal acetic acid, 29 g (0.22 mol) of 2-ethylhexanol was added and a dehydration condensation reaction was carried out at 200° C. for 4 hours. The pressure was reduced from atmospheric pressure to 30 mmHg and maintained at 30 mmHg to completely remove the formed water.

The crude polyester thereby obtained was subjected to vacuum distillation by further reducing the pressure to 5 mmHg, whereby 5.7 g of an initial fraction and 197 g of a polyester were obtained. It took 9 hours for the entire process. In the initial fraction, 3.3 g of 2-ethylhexyl acetate was contained and this corresponds to 5% as a theoretical amount of acetic acid.

2 g of the polyester thus obtained was introduced into a 300 ml flat bottom flask containing 2 g of potassium hydroxide, 30 ml of water and 30 ml of ethanol, and after attaching a condenser, the mixture was heated under a boiling condition for 3 hours. After cooling the mixture, 4 ml of concentrated hydrochloric acid was added to obtain an acidic solution. From the gas chromatography analysis, the proportions of adipic acid, 1,2-BG, 2-ethylhexanol and acetic acid in the aqueous solution were found to be as follows.

| Adipic acid | 1.20 g | $8.2 \times 10^{-3}$ mol | 9.1 molar ratio |
| --- | --- | --- | --- |
| 1,2-BG | 0.64 g | $7.1 \times 10^{-3}$ mol | 7.9 molar ratio |
| 2-ethylhexanol | 0.24 g | $1.8 \times 10^{-3}$ mol | 2.0 molar ratio |
| Acetic acid | 0.006 g | $1.0 \times 10^{-4}$ mol | 0.1 molar ratio |

This indicates that the polyester had an average polymerization degree of about 8 and an average molecular weight of 2100.

Further, this polyester had a viscosity of 1800 cp and an acid value of 0.72 mgKOH/g.

67 g of this polyester was thoroughly mixed with 100 g of a vinyl chloride resin having a polymerization degree of 1050 and 1 g of a stabilizer, and a soft vinyl chloride resin sheet was prepared in the same manner as in Example 1. The physical properties of the sheet are shown in Table 3. From these results, it is evident that the polyester of this Example is well qualified as a plasticizer showing no adverse effects to the physical properties of the sheet, even when compared with the polyester produced with use of purified 1,2-butanediol.

EXAMPLE 10

In the same flask as used in Example 9, 146 g (1.0 mol) of adipic acid, 102 g (0.95 mol) of crude 1,2-BG, 29 g (0.22 mol) of 2ethylhexanol and 0.25 g of dibutyl tin oxide were introduced and gradually heated to 200° C., whereby a condensation reaction was carried out. After 3 hours, the distillation of water and acetic acid stopped under reduced pressure of 30 mmHg.

The distilled solution was found by the analysis to have the following composition.

| Recovered amount | 26 g | Acetic acid | 10 g | Recovery rate | 43% |
| --- | --- | --- | --- | --- | --- |
| | | Water | 13.9 g | | 51% |
| | | Crude 1,2-BG | 0.8 g | | |
| | | 2-ethylhexanol | 1.3 g | | |

This indicates that the added 2-ethylhexanol was consumed to form an acetic acid ester and the reaction was thereby terminated.

Then, 29 g (0.22 mol) of 2-ethylhexanol was further added and the dehydration condensation was continued. After 5 hours, the distillation of water and acetic acid was no longer observed. The acid value of the reaction solution was 0.68 mgKOH/g.

Then, the reaction solution was subjected to vacuum distillation by further reducing the pressure to 5 mmHg, whereby 40.9 g of an initial fraction and 195 g of a polyester were obtained. It took 11 hours for the entire process.

In the initial fraction, 30.8 g of 2-ethylhexyl acetate was recovered, and the total amount including the above-mentioned distilled amount becomes to be 32.1 g which corresponds to 48% of the theoretical amount of acetic acid. This indicates that 2-ethylhexanol was consumed.

The polyester had an average molecular weight of 2200, a viscosity of 1850 cp and an acid value of 0.83 mgKOH/g.

As apparent from the foregoing, the time required for the reaction varies to a great extent depending upon whether or not acetic acid is preliminarily removed during the condensation reaction, and further there is a substantial difference in the amount of the monohydric alcohol required. Thus, it is evident that it is extremely advantageous to preliminarily remove acetic acid.

EXAMPLE 11

Into the same flask as used in Example 1, 117 g (0.8 mol) of adipic acid, 30 g (0.2 mol) of phthalic anhydride, 86 g (0.95 mol) of 1,2-BG, 39 g (0.3 mol) of 2-ethylhexanol and 0.25 g of dibutyl tin oxide were introduced and gradually heated to 220° C., whereby a condensation reaction was carried out. The reduced pressure was controlled to maintain the temperature at a level of 220° C. and the reaction was carried out for 7 hours, whereby a reaction solution having an acid value of 0.67 mgKOH/g was obtained. Thereafter, vacuum distillation was conducted by further reducing the pressure to 5 mmHg, whereby 220 g of a polyester as shown in Table 3 was obtained. Using this polyester, a sheet was prepared in the same manner as in Example 1, and the physical properties of the sheet were measured. The results thereby obtained are shown in Table 3.

EXAMPLE 12

A polyester containing trimellitic acid was prepared in the same manner as in Example 11 except that the amounts of the feed materials were 131 g (0.9 mol) of adipic acid, 19 g (0.1 mol) of trimellitic acid anhydride and 90 g (1.0 mol) of 1,2-BG.

It took 7 hours for the condensation reaction and 3 hours for the transesterification reaction (i.e. the distillation under reduced pressure), whereupon 224 g of a polyester was obtained. Using this polyester, a sheet was prepared in the same manner as in Example 1, and the physical properties of the sheet were measured. The results thereby obtained are shown in Table 3.

TABLE 3

|  | Example 9 | Example 11 | Example 12 |
| --- | --- | --- | --- |
| Physical properties of the polyester |  |  |  |
| Average molecular weight | 2100 | 2200 | 2700 |
| Viscosity (25° C.) (CP) | 1800 | 4200 | 7900 |
| Physical properties of the sheet |  |  |  |
| Tensile strength (kg/cm$^2$) | 220 | 285 | 320 |
| Elongation (%) | 405 | 410 | 390 |
| 100% modulus (kg/cm$^2$) | 90 | 112 | 125 |
| Gasoline extraction (%) | 6.5 | 5.2 | 3.7 |
| Soap water extraction (%) | 0.5 | 0.3 | 0.4 |
| Evaporation loss (%) |  |  |  |
| 1 day | 0.6 | 0.4 | 0.4 |
| 6 days | 2.5 | 1.9 | 1.3 |
| Low temperature flexing temperature (°C.) | −18 | −14 | −11 |
| Hardness | 73 | 80 | 91 |
| Compatibility |  |  |  |
| one day later | A | A | A |
| one week later | A | A | A |

TABLE 3-continued

|  | Example 9 | Example 11 | Example 12 |
| --- | --- | --- | --- |
| Non-migration property |  |  |  |
| ABS | B | B | A |
| PSR | A | A | A |

We claim:

1. A polyester having plasticizing properties which is liquid at 25° C., which comprises:
a polybasic acid and crude 1,2-butanediol as its reactive monomer constituents, in a ratio of 1.0 equivalent of said acid to 0.1 to 3 equivalents of said crude alcohol, calculated as 1,2-butanediol, being composed at least partially of 1,2-butanediol and acetoxyhydroxy butane and/or diacetoxybutane as impurities.

2. The polyester of claim 1, wherein said crude 1,2-butanediol is composed of 1,2-butanediol, 1-acetoxy-2-hydroxybutane, 1-hydroxy-2-acetoxybutane, and 1,2-diacetoxybutane.

3. The polyester of claim 1, wherein the polybasic acid is at least one polybasic acid selected from the group consisting of phthalic anhydride, isophthalic acid, terephthalic acid, trimellitic acid anhydride, pyromellitic acid anhydride, glutaric acid, adipic acid, azelaic acid and sebacic acid.

4. The polyester of claim 1, wherein the reacting material further includes at least one polyhydric alcohol selected from the group consisting of ethylene glycol, 1,3-propanediol, 1,3-butanediol, 1,4-butanediol, 1,5-pentanediol, 1,6-hexanediol, neopentyl glycol and pentaerythritol.

5. The polyester of claim 1, which further comprises a monobasic acid as a molecular weight controlling agent, said monobasic acid being the acetic acid released from said crude 1,2-butandiol during its reaction with said polybasic acid.

6. The polyester of claim 1, wherein a monobasic acid is added to the reaction system as a supplement to the acetic acid released during polyester formation.

7. The polyester of claim 1, which further comprises a monohydric alcohol as a molecular weight controlling agent with the amount of polyhydric alcohol reacting with said polybasic acid being adjusted to 0.1 to 1.3 equivalents per equivalent of said polybasic acid.

* * * * *